Patented May 28, 1940

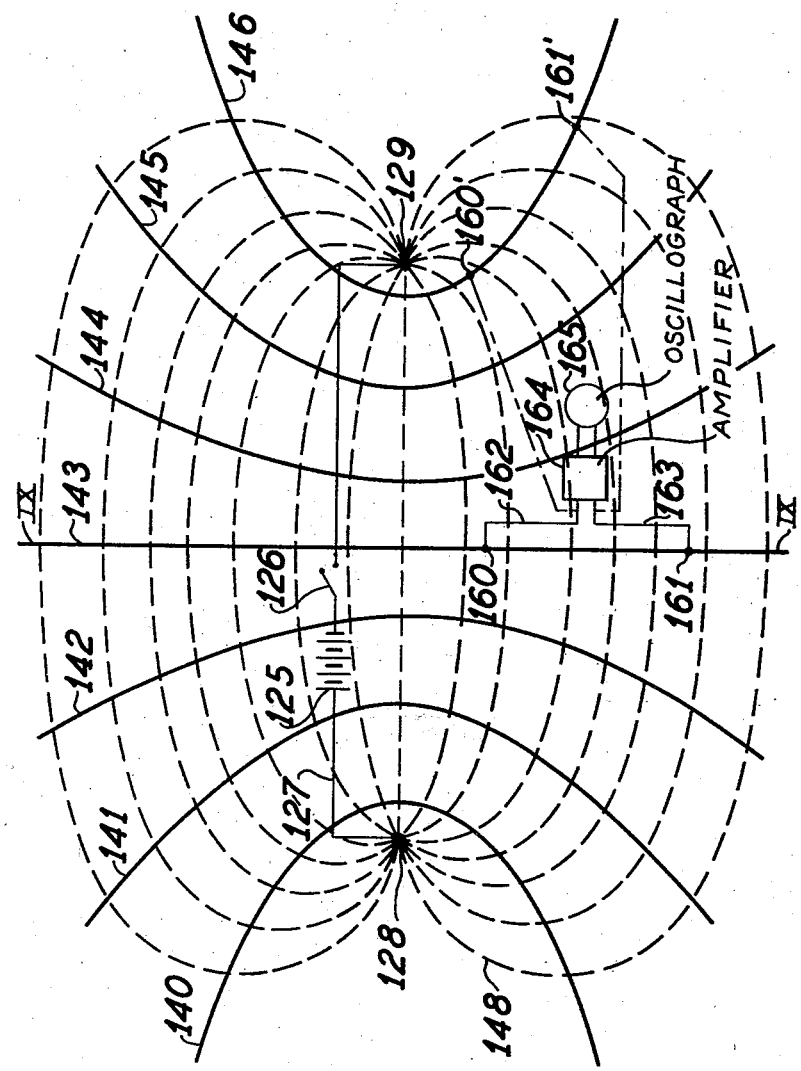

2,202,369

UNITED STATES PATENT OFFICE 2,202,369

ELECTRIC EARTH TRANSIENTS IN GEOPHYSICAL PROSPECTING

Ludwig W. Blau and Louis Statham, Houston, Tex., assignors to Standard Oil Development Company, a corporation of Delaware Original application November 13, 1936, Serial No. 110,566. Divided and this application December 30, 1938, Serial No. 248,366

7 Claims. (Cl. 175—182)

The present invention relates to an improvement in the use of electric earth transients in geophysical prospecting and is a division of the invention disclosed in our copending application Serial No. 110,566, filed Nov. 13, 1936, now Patent No. 2,160,824 of June 6, 1939.

In electric transient prospecting a transient electric field has been sent out between spaced electrodes, called the current electrodes, and has been observed by means of an electric circuit including two other electrodes, called the potential electrodes. A study of the transient so observed has revealed information concerning the electric properties of the earth. In practice, it has been found advantageous to observe transient time gradients rather than transients, and for this purpose it has been the custom to cause electric current to flow simultaneously through spaced volumes of the earth, to record the transients so produced in opposite phase at a single receiving station, and to observe the difference between the transients. This is described in the co-pending application of Louis Statham, No. 54,179, filed December 13, 1935, now Patent No. 2,113,749 of April 4, 1938, entitled "Method and apparatus for comparing electrical transients."

According to the embodiment of our original invention, to which our present claims are directed, transient prospecting is simplified by locating the pickup points on equipotential lines along the path of the current. Briefly, in this form of the invention two electrically connected electrodes are embedded in the ground at a selected distance from each other ranging from a few hundred feet to several thousand feet, two thousand feet being a convenient spacing. Direct current is caused to flow in the circuit of the electrodes until steady state conditions are attained; then, by the use of a pair of electrically connected probe electrodes, equipotential lines are located along the path of the current. This is usually done by arranging the probe electrodes on either side of a line connecting the charging electrodes and moving the probe electrodes until there is no potential difference between them.

When an equipotential line is located, two electrically connected pickup electrodes, in the circuit of which is included an oscillograph, or any other wave tracing means, are arranged on the equipotential line at a distance from each other ranging from a few hundred feet to several hundred feet, a suitable distance being about five hundred feet, preferably with a pickup electrode on either side of a line connecting the charging electrodes. A transient is then set up between the charging electrodes either by breaking the circuit already established, by changing the voltage in said circuit, or by breaking the circuit and, after a pause of a few minutes, again closing it.

This embodiment of our invention will be better understood from the following detailed description of the accompanying drawing in which the single figure is a plan view showing one arrangement of apparatus which may be embodied and in which current lines and equipotential lines are graphically illustrated.

Referring to the drawing in detail, a direct electric current is passed through the earth by means of battery 125 and switch 126 which are connected through a line 127 with current electrodes 128 and 129 embedded in the ground. Reference numerals 140 to 146 inclusive represent equipotential lines which are created at the earth's surface by a difference of potential between the energization electrodes 128 and 129 if the subjacent earth within significant proximity of these electrodes is of uniform conductivity. These equipotentials represent the intersection of the earth's surface with equipotential surfaces. The current lines are designated 148 and the direction of current flow by the arrows 149. Potential electrodes 160 and 161 are embedded in the ground and are connected by lines 162 and 163 to an amplifier 164 and oscillograph 165.

In the embodiment illustrated, the potential electrodes 160 and 161 are disposed on the median potential line 143 but may be placed on any equipotential line as shown by the dot and dash line connection to electrodes 160' and 161'. In using this form of the invention, a transient electric field is observed without the direct component since both potential electrodes are placed on the same steady state equipotential line. The transient observed in this manner will have the same general appearance as the transient difference obtained when two separate potential circuits are established at other than equipotential points along the current path and the transients obtained in said circuits are opposed to each other in the recording apparatus. The various deflections of the transient from the zero line indicate, however, when this embodiment of the invention is employed, the tilting of the various beds of which the earth is composed. If the deflections vanish when the potential electrodes are placed symmetrically on either side of a straight line connecting the two current electrodes 128 and 129, then the beds are parallel to the surface of the earth, but, if the deflections do not vanish, the beds are not parallel to the surface and the angles of deviation from the parallel are proportional to the magnitude of the deflections.

While the invention has been described as applied to the surface of the earth, it will be understood that it can be carried out in water, under water, along the sides of cliffs, or other vertical structures, in boreholes such as oil wells, or in mines. Also it can be applied to the determination of the electrical properties of other materials, such as metals, semi-conductors, and insulators.

Various changes and alternative arrangements may be made within the scope of the appended claims in which it is our intention to claim the novelty inherent in the invention as broadly as the prior art permits.

We claim:

1. The method of investigating the properties of matter which comprises passing a steady state current between spaced electrodes in the matter, locating an equal potential line in said matter due to said steady state current, locating a second pair of spaced electrodes on said equipotential line, changing the value of said current, and exhibiting a value indicative of the difference in potential between said receiving electrodes due to said changing current.

2. The method of investigating the properties of matter which comprises passing a direct electric current between spaced electrodes in the matter, whereby equipotential lines are set up along the path of the current in the matter, receiving a transient of said current as modified by its passage through the matter at spaced potential electrodes located on one of said equipotential lines, and exhibiting the difference in potential between said potential electrodes due to said transient.

3. The method of investigating the properties of matter which comprises passing a direct current between spaced electrodes in the matter, locating an equipotential line in said matter under steady state conditions of said current, arranging a pair of spaced electrically connected electrodes on said equipotential line, initiating a transient between said first mentioned electrodes and observing the difference in potential between said second mentioned electrodes due to said transient.

4. The method of geophysical prospecting which comprises passing a steady state current between spaced electrodes in the ground in the area to be investigated, locating an equipotential line in the ground due to said steady state current, locating a second pair of spaced electrodes on said equipotential line, changing the value of said current and exhibiting a value indicative of the difference in potential between said receiving electrodes due to said changing current.

5. The method of geophysical prospecting which comprises passing a direct electric current between spaced electrodes in the ground in the area to be investigated, whereby equipotential lines are set up along the path of the current in the ground, receiving a transient of said current as modified by its passage through the ground at spaced potential electrodes located on one of said equipotential lines, and exhibiting the difference of potential between said potential electrodes due to said transient.

6. The method of geophysical prospecting which comprises passing a direct current between spaced electrodes in the ground in the area to be investigated, locating an equipotential line in the ground under steady state conditions of said current, arranging a pair of spaced electrically connected electrodes on said equipotential line, initiating a transient between said first mentioned electrodes, and observing the difference in potential between said second mentioned electrodes due to said transient.

7. The method of geophysical prospecting which comprises passing a direct current between spaced electrodes in the ground in the area to be investigated, locating the median equipotential line in the ground between said electrodes under steady state conditions of said current, arranging a pair of spaced electrically connected electrodes on said equipotential line symmetrically with respect to said first mentioned electrodes, initiating a transient between said first mentioned electrodes and observing the difference in potential between said second mentioned electrodes due to said transient.

LUDWIG W. BLAU.
LOUIS STATHAM.